Figure 1:
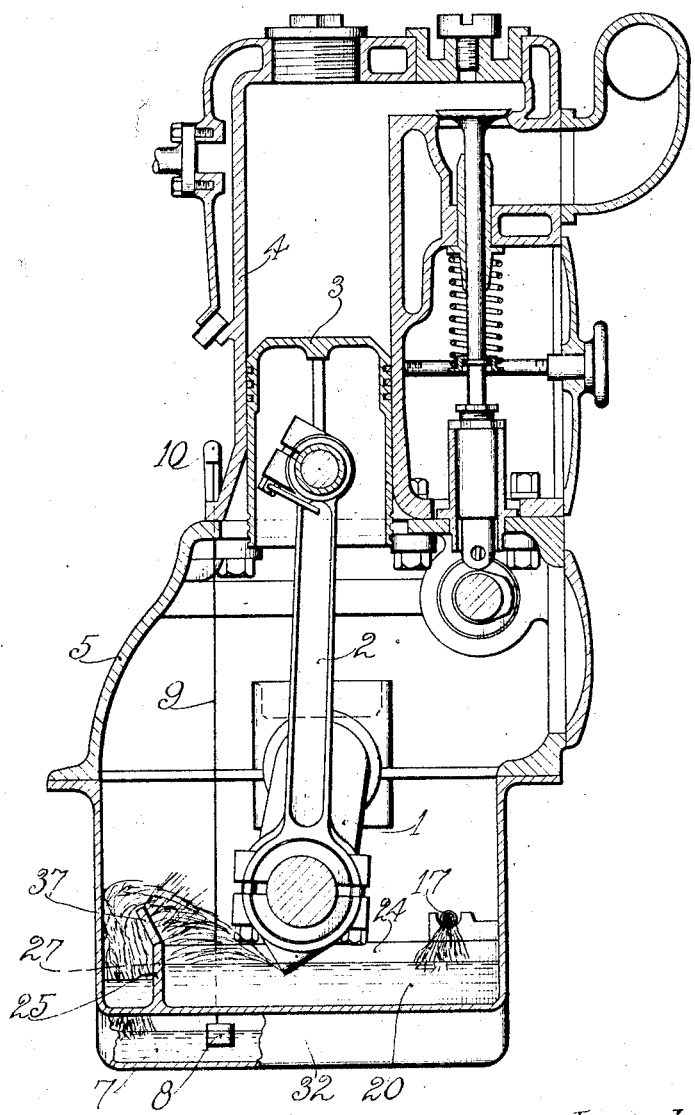

H. L. HORNING.
OILING SYSTEM FOR INTERNAL COMBUSTION MOTORS.
APPLICATION FILED APR. 7, 1916.

1,213,875.

Patented Jan. 30, 1917.
3 SHEETS—SHEET 1.

Inventor:
Harry L. Horning
By Brown, Hanson & Boettcher
Attorneys.

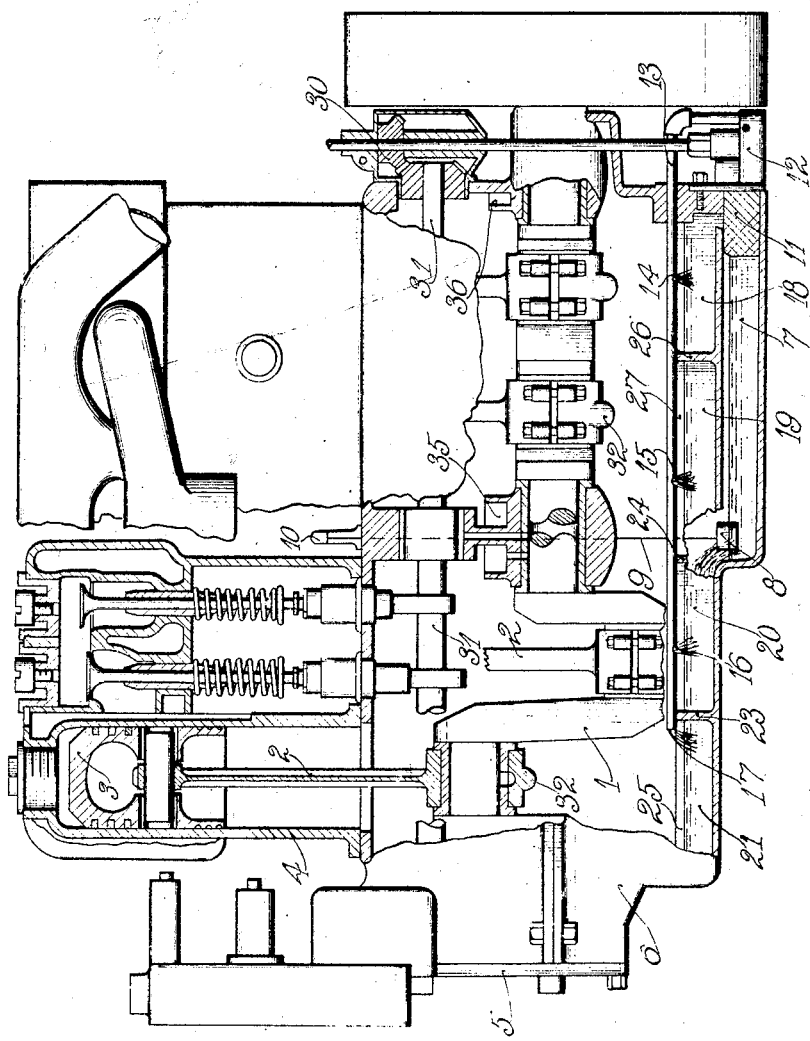

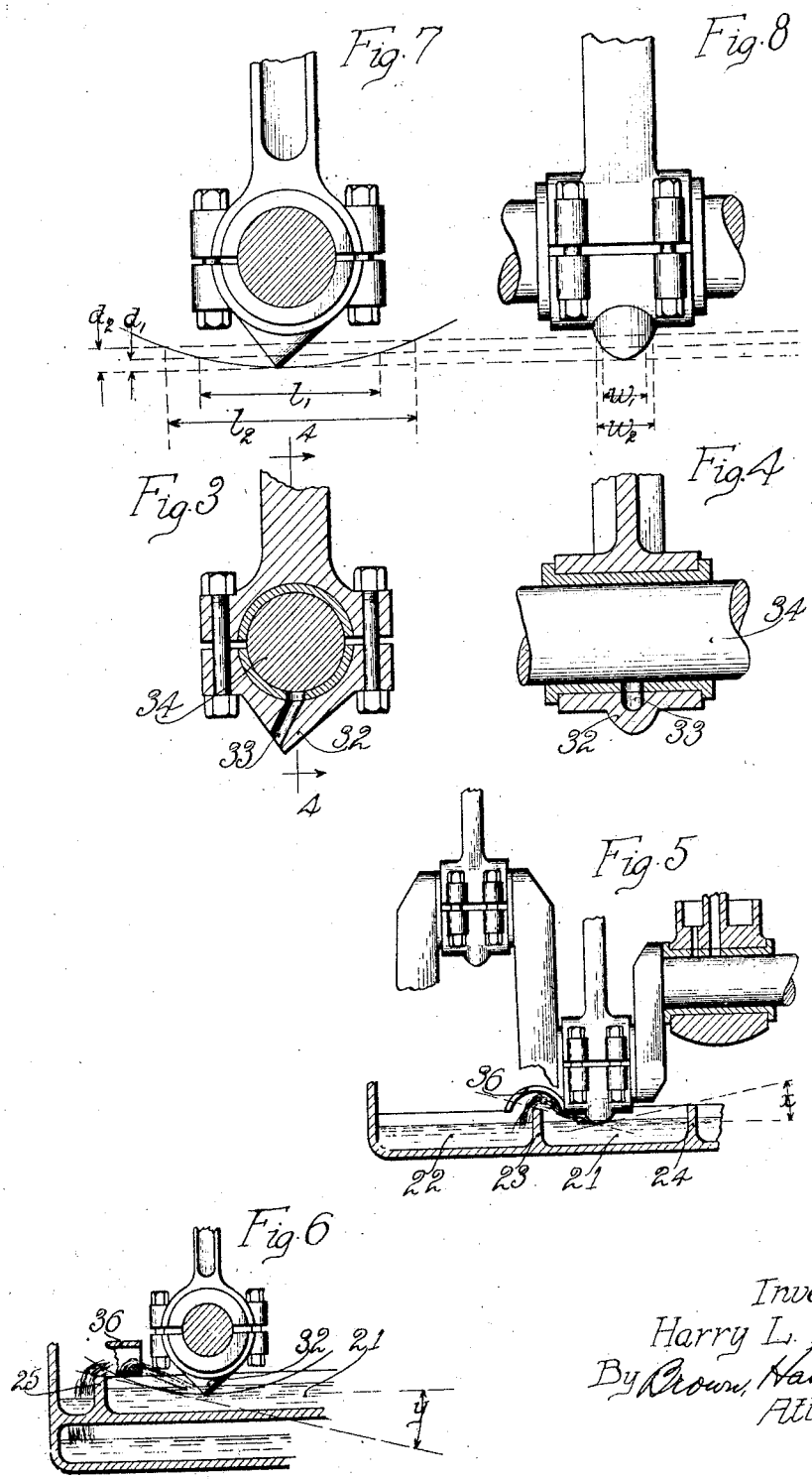

UNITED STATES PATENT OFFICE.

HARRY L. HORNING, OF WAUKESHA, WISCONSIN, ASSIGNOR TO WAUKESHA MOTOR CO., OF WAUKESHA, WISCONSIN, A CORPORATION OF WISCONSIN.

OILING SYSTEM FOR INTERNAL-COMBUSTION MOTORS.

1,213,875.

Specification of Letters Patent.

Patented Jan. 30, 1917.

Application filed April 7, 1916. Serial No. 89,548.

*To all whom it may concern:*

Be it known that I, HARRY L. HORNING, a citizen of the United States, residing at Waukesha, in the county of Waukesha and State of Wisconsin, have invented a certain new and useful Improvement in Oiling Systems for Internal-Combustion Motors, of which the following is a full, clear, concise, and exact description, reference being had to the accompanying drawings, forming a part of this specification.

My invention relates to oiling systems for internal combustion motors.

My invention aims to provide an improved system for oiling the necessary bearing surfaces of an internal combustion engine by an internal splash system.

According to my invention individual pans or pockets containing oil are located under the crank pins and each connecting rod is provided with a scoop of special design for picking up oil to lubricate the bearings and to distribute the oil by splash to the various bearing surfaces and in addition to control the level of the oil in the pans or pockets. These receptacles are supplied with oil at a flow proportional to the speed of the engine and the oil scoop of each connecting rod is designed to discharge the oil from the individual receptacles to an overflow from whence it is conveyed to a cooling surface and after being strained, the oil is again discharged into the receptacle. The pockets or pans are made shallow and wide with the oil level maintained below the level of the walls. That is to say, the level is not controlled by the height of the wall. The scoop itself determines the normal level of the oil in the pan. Therefore tilting of the motor endwise or sidewise has no influence upon the oil level until the critical angle of inclination is reached. At this angle the oil begins to escape over the side walls into the overflow and the natural consequence is a lowering of the oil level in the pans. At the critical angle the side walls of the pans begin to control the level of the oil. Within the given angle the level of each pan is kept constant at just the right height to secure efficient lubrication with a minimum loss of friction due to churning the oil. Provision is made for deflecting part of the oil that is thus splashed by each of the scoops to reach bearings which ordinarily would be supplied by adjacent scoops. In this manner great reliability and safety in operation is secured.

I shall now describe my invention in connection with the accompanying drawings in such full, clear and concise terms as will enable those skilled in the art to construct and practise the invention.

Figure 1 is a vertical cross-section of an engine employing my system of oiling; Fig. 2 is an elevational view with parts broken away to reveal the working parts of the oiling system; Fig. 3 is a vertical cross-section of the scoop and the end of the connecting rod; Fig. 4 is a section taken on the line 4, 4 of Fig. 3; Fig. 5 is an illustration of the deflector for deflecting a part of the splash from one pan to the adjacent pan; and Fig. 6 is a section of the same taken at right angles to Fig. 5; Figs. 7 and 8 are diagrammatic views to illustrate the "dip" of the scoop.

The motor may be of any preferred type, the one that I have illustrated being a four-cycle engine of four cylinders. This engine has a crank-shaft 1 which is connected by suitable connecting rods 2 to the pistons 3. The pistons 3 are freely movable on the interiors of the cylinders 4, which cylinders are mounted upon the upper section 5 of the crank-case. The lower part of the crank-case 6 is provided with a wide flat bottom in order to accommodate the system of oiling which is the subject matter of the present application. The bottom of the section 6 is provided with a depressed portion or pocket 7 which forms a reservoir for oil. This reservoir is below the oiling pan of the two foremost cranks, which will be later described, but the level of the oil therein is indicated by means of the float 8 which is connected by a rod 9 to a suitable indicator 10 at the side of the engine convenient for inspection. The oil reservoir 7 is connected through a strainer 11 to a pump 12, herein shown as of the rotary type. The pump discharges the oil through a feeding pipe 13 which is provided with outlets 14, 15, 16 and 17 for discharging oil to each individual oiling pan.

As shown in the accompanying drawings the individual oiling pans 20 and 21 are formed integral with the bottom of the crankcase by means of transverse ribs 23 and 24 and a longitudinal wall 25. This longitudinal wall in connection with the scoop at its lowest point determines the sidewise tilting permissible in the motor, i. e., defines the critical angle.

The oil pans 18 and 19 are formed as a separate casting suspended above the reservoir 7. These pans or pockets 18 and 19 have a separating wall 26 between them and have an end wall 27 of substantially the same height as and in line with the wall 25. The space between the wall 25 and the adjacent side of the crankcase forms an overflow or discharge passage 27 along which the oil runs back to the reservoir 7 after being discharged from the individual pans or pockets.

The pump 12 may be connected in any preferred manner. I have shown the same as geared by means of the bevel gears 30 to the cam shaft 31. Inasmuch as the cam shaft 31 is directly geared to the crank shaft 1, it will be seen that the pump 12 is operated in accordance with the speed of the motor and the oil discharged will also be proportional to the speed of the motor. The tendency would be upon high speed to pump all of the oil out of the well or reservoir 7 and discharge the same into the individual pans or pockets. It is to be noted that the lower end of each connecting rod is provided with a scoop of circular or similarly curved outline 32. This scoop is provided at its forward face with an opening 33 which is connected by a suitable passage to the bearing surface of the corresponding crankpin 34. It will now be apparent that if the level of the oil in the pockets tends to rise, the scoop will discharge it more rapidly and thus keep the level substantially constant. This will be apparent from the diagrams of Figs. 7 and 8, in which it will be noted that the width of contact and the length of time in contact will be greater the higher the level of the oil. It is to be noted that the increase in the amount of oil pumped is due to engine speed and the increase in engine speed causes a proportionate increase in the number of times that the scoop engages the oil, but that the present system does not depend on this coördination solely to preserve a definite level. The level is maintained by the increased quantity which is thrown out upon an increase in level and by the decreased quantity that is thrown out upon a decrease in level so that the oiling will be nearly uniform at all speeds and under all conditions.

Assume that the level of the oil is such that at each stroke the depth of dip of the scoop 32 is equal to the distance $d_1$ shown in Figs. 7 and 8. The width of the scoop 32 at such depth of dip is $w^1$ and the length of stroke in contact with the oil is shown as $l_1$. If the speed of the engine increases the level of the oil tends to increase, but at the same time the number of dips per unit of time increases. If it were possible to balance exactly the amount splashed out at each stroke by the amount pumped in at each stroke for all speeds the level would always remain constant. But such balancing is impossible. As it is necessary for some means to control the level I find it advisable to impose this control upon the scoops rather than upon the pump or upon the walls of the pan upon the theory that variations in oiling must be upon the side of excess rather than upon the side of deficiency. If the level rises so that the depth of dip is $d_2$ (Fig. 7) a greater width of the scoop $w_2$ will be active along a path of length $l_2$. Thus it can be seen that the amount which is scooped out when the level is high is greater than when the level is low and the control of the level lies with the element to be lubricated.

The oil from the splash is conveyed to the various bearings of the engine, pockets such as shown at 35 and 36 in Fig. 2 being provided for catching part of the oil and conveying the same to the main bearing. Other pockets are provided for catching the splash for other uses, such as the front gear system, countershaft bearing, etc. The splash also reaches and lubricates the wrist pin and the cylinders and pistons, the surplus of the oil dropping back to be used over again. The lower crankcase 6 is made flat so that as large a quantity as possible may be retained in each of the individual pockets, and a large surface exposed to the atmosphere in order to cool the oil by radiation.

Special deflectors, such as shown in Fig. 5, may be provided between adjacent oil pockets in order to supply one pocket with oil from the adjacent pocket in case of a stoppage of the oil from the pump to that particular pocket. The supply of oil thus furnished to the bearings might be insufficient for adequate lubrication, but would prevent sudden destruction of the bearing, and thus the serviceability and life of the bearing would be prolonged beyond the usual period. The curved deflector 36 is placed over the cross wall 23 in such position that the oil splash from one oil pan will be in part conveyed to the adjacent pan, and vice versa. The front wall 25 may be modified by special splash plates 37 set at any particular part of the length of said plates in order to control the amount of oil splashed to the various points. Thus, if it were desired to increase the amount of oil conveyed to a particular bearing the splash plate 37 may be provided to insure an ample supply of oil to that bearing.

It is to be noted that the height of the pan defines the angles to which the motor may be tilted and proper operation of the splash system maintained. It can be seen thus that if the motor be tilted with its front end up at an angle such as indicated at X in Fig. 5, the oil would run out of the pocket to such an extent as to be no longer available for splash purposes. In a similar manner, if the motor were tilted sidewise at an angle such as represented by Y in Fig. 6, the same condition would prevail, namely, the oil would run over the walls of the oil pans and would be out of contact with the scoop 32. The angle X is determined by a horizontal line drawn tangent to the point of the scoop and a line drawn tangent to the scoop and the top of the end wall—14 23 or 24. The angle Y is determined by a horizontal line drawn tangent to the path of the tip of the scoop, and a line drawn through the edge of the front wall 25 and tangent to the path of the tip of the scoop 32 as shown in Fig. 6.

While I have described one specific embodiment of my invention, it is to be understood that I am not to be limited to the shapes, forms and proportions shown in the accompanying drawings and described in the specification.

I claim:

1. In combination, a crank case, a crank shaft mounted in said case, an oil pocket below the crank of said shaft, an oil reservoir, a pump operating at a speed proportional to the speed of the crank shaft for pumping oil from said reservoir to said pocket, a return passage leading to said reservoir, and a scoop on said crank for dipping into said pocket as the crank shaft rotates to throw oil out of said pocket into said return passage, said scoop being of such throwing capacity as to maintain the level of oil in said pocket below the overflow point.

2. In combination, a motor crank case, a crankshaft mounted in said case, said crankcase having an oil reservoir and a plurality of individual pockets, each pocket being individual to the corresponding crank pin upon said crankshaft, said pockets having a transverse wall spaced from the side wall of said crankcase to form a common passageway, said crankcase having a storage reservoir for receiving the oil discharged from the pockets, a pump geared to said crankshaft for discharging oil from said reservoir to each individual pocket, and scoops upon the connecting rod of each crankpin for splashing the oil from the individual pockets over said longitudinal wall into the common passageway, said scoop members being of such throwing capacity as to maintain the level of oil in said pockets below the overflow point.

3. In combination, a crank case, a crank shaft mounted in said case, said shaft having a plurality of cranks, an oil pocket below each crank, an oil reservoir, a pump operating at a speed proportional to the speed of the crank shaft for pumping oil from said reservoir individually to said pockets, a common return passage leading to said reservoir, and a scoop on each of said cranks for dipping into the respective oil pocket as the crank shaft rotates to throw oil out of said pocket into said common return passage, said scoops being of such throwing capacity as to maintain the level of oil in said pocket below the overflow point.

4. In combination, a case, a crankshaft mounted in said case, said case having pans or pockets individual to the crankpins of said shaft, a passage between the side of said crankcase and said pans for carrying off the excess oil which is splashed out of the pans and a deflector upon the edge of said pan.

5. In combination a crankcase, a crank mounted in said case, said case having a broad flat bottom and having individual pockets arranged therein for the individual crankpins, said pans having a common longitudinal wall spaced from the side wall of said case to form an overflow channel, deflectors for said pans, said deflectors being adapted to deflect the splash to adjacent pans.

6. In combination a pan adapted to contain a liquid, a moving element adapted to dip into said pan, said element being adapted to move at different speeds and means for pumping liquid into said pan substantially in proportion to the speed of said element, said moving element having means for throwing out the liquid from said pan to maintain a desired level of oil in said pan, said latter means moving in a fixed path with respect to said pan, said path extending a substantial distance below the edges of said pan, said latter means being adapted to throw out the oil more rapidly for a high level of liquid than for a low level of liquid.

7. In combination, a crank case, a crank shaft mounted in said case, said shaft having a plurality of cranks, an oil pocket below each crank, an oil reservoir, a pump operating at a speed proportional to the speed of the crank shaft for pumping oil from said reservoir individually to said pockets, a common return passage leading to said reservoir, and a scoop on each of said cranks for dipping into the respective oil pocket as the crank shaft rotates to throw oil out of said pocket into said common return passage to maintain a desired level of oil in said pocket, the faces of said scoop being widened toward the top to throw proportionally more oil as they dip deeper into the oil.

In witness whereof, I hereunto subscribe my name this 15 day of February, A. D. 1916.

HARRY L. HORNING.